United States Patent
Mahakul

(10) Patent No.: US 12,270,364 B1
(45) Date of Patent: Apr. 8, 2025

(54) DIRECT IN CYLINDER INJECTOR FOR GASEOUS FUEL

(71) Applicant: Budhadeb Mahakul, Naperville, IL (US)

(72) Inventor: Budhadeb Mahakul, Naperville, IL (US)

(*) Notice: Subject to any disclaimer, the term of this patent is extended or adjusted under 35 U.S.C. 154(b) by 0 days.

(21) Appl. No.: 18/809,292

(22) Filed: Aug. 19, 2024

Related U.S. Application Data

(63) Continuation of application No. 18/487,684, filed on Oct. 16, 2023, now Pat. No. 12,104,560.

(60) Provisional application No. 63/416,630, filed on Oct. 17, 2022.

(51) Int. Cl.
*F02M 47/04* (2006.01)
(52) U.S. Cl.
CPC .................. *F02M 47/046* (2013.01)
(58) Field of Classification Search
CPC ........................................ F02M 47/046
See application file for complete search history.

(56) References Cited

FOREIGN PATENT DOCUMENTS

WO  WO-2021180849 A1 * 9/2021  ......... F02M 21/0206

OTHER PUBLICATIONS

A Review of Hydrogen Direct Injection for Internal Combustion engines: Towards Carbon-Free Combustion Appl. Sci. 2019, 4842 Ho Lung Yip 1 , Aleš Srna 1.
SAE 2018-01-1145 summarizes 40 Years of Japanese Hydrogen ICE research and development. Kimitaka Yamane, Yamane Hydrogen Energy Research Lab.
SAE 2008-01-2379 Challenges in Developing Hydrogen Direct Injection Technology for Internal Combustion Engines. Alan Welch, David Mumford and Sandeep Munshi.
Findings of Hydrogen Internal Combustion Engine Durability Project Period: Mar. 7, 2007-Dec. 31, 2010 Garrett P. Beauregard Mar. 31, 2011 DE-FC26-06NT43027.
The 2-stroke Low-Pressure Dual-fuel Technology: From Concept to Reality Marcell Ott, Cimac Congress Helsinki Jun. 6-10, 2016 2016 | 233.
Is there a place for H2 internal combustion engines—Dr. Ales Srna, February H2IQ hour: Overview of Hydrogen Internal combustion engine (H2ICE) Technologies, Feb. 22, 2023.

* cited by examiner

*Primary Examiner* — Jacob M Amick
*Assistant Examiner* — Charles J Brauch

(57) ABSTRACT

A novel in-cylinder fuel injector has been created for internal combustion engines using gaseous fuels such as hydrogen and low-carbon alternatives. This injector enhances the reliability and fuel efficiency of both spark-ignited and compression-ignition engines. The injector's innovative design encompasses a poppet-style valve for fuel injection and a fuel supply valve to govern fuel flow. Furthermore, it incorporates a distinct lubrication system that caters to the valve, seat, and sliding surface. Additionally, the injector includes valve actuators and a control system, effectively managing fuel injector actuation, injection timing, quantity, and valve actuation sequence. Notably, the design also integrates a lubrication system with a control valve.

13 Claims, 6 Drawing Sheets

DIRECT IN CYLINDER INJECTOR FOR GASEOUS FUEL

CROSS-REFERENCE TO RELATED APPLICATION

This application is a continuation of U.S. patent application Ser. No. 18/487,684, entitled "Direct In cylinder injector for gaseous fuel," filed Oct. 16, 2023, which claims priority to and the benefit of U.S. Provisional Patent Application No. 63/416,630, entitled "Direct In cylinder injector for gaseous fuel," filed Oct. 17, 2022, the disclosure of each of which is incorporated by reference in its entirety.

BACKGROUND

The embodiments described herein relate to a direct in cylinder fuel injector for hydrogen and other low carbon gaseous fuel. More specifically this invention relates to an injector design that has higher combustion efficiency and maintains high power density when using hydrogen or low carbon gaseous fuel in an internal combustion engine. The injector design provides protection for a hydrogen or low carbon gaseous fuel that does not provide lubricity. The injector can be used in the hydrogen fuel cell by providing continuous, and modulated hydrogen flow with a reliable fuel shut-off system.

The transportation sector accounts for 28% of greenhouse gas emissions, making it essential to embrace new fuels like hydrogen, a zero-carbon fuel, to address this environmental challenge. Among the solutions available, hydrogen internal combustion engines play a significant role. A key component needed for these engines is a reliable hydrogen fuel injector delivering high injection pressure for efficiency.

Gaseous fuels lack the inherent lubrication found in liquid fuels, and as a result, existing injectors suffer from lubrication deficiencies. In certain cases, the operator resorts to manual lubrication by introducing a small amount of engine oil into the injector's inlet each day before engine startup. Nonetheless, these systems and procedures are far from feasible for commercial applications.

In gaseous fuel injectors, a challenge arises due to the occurrence of metal-to-metal contact when the valve is seated, resulting in accelerated wear of the contact surface. Various approaches, including the use of hardened materials and the reduction of the valve closing speed, have been explored to address this issue, but these attempts have yielded only marginal improvements. This problem becomes particularly pronounced in the case of hydrogen injectors, where substantial quantities of hydrogen must be delivered to match the energy output of liquid fuels. Consequently, larger-sized injectors with high valve lift are required, exacerbating the wear issue.

There is a need for improved injectors and systems for injecting gaseous fuels in internal combustion engines. A poppet valve provides a larger opening area, to deliver the high volumetric flow of hydrogen. The larger opening area reduces the valve lift, which lowers the contact force between the valve and the seat. The larger opening area provides a means for optimizing injection timing and volume to improve combustion efficiency.

Lubrication of the valve and seat is provided by a dedicated passage and has a control valve that regulates the lubricating oil supply. The flow of lubricant is achieved when the poppet valve is seated and high pressure hydrogen is shut off by the fuel supply valve and the gas supply drilled passage in the poppet valve shoulder.

The fuel injector design allows the presence of high gas pressure in the poppet valve area only during the injection period when the valve is open This eliminates a leakage path for hydrogen thus enabling high gas supply pressures above 10,000 psi. Higher pressure offers higher combustion efficiency for the internal combustion Accordingly what remains needed in the art is a direct in cylinder high pressure injector that will match the reliability of a state of the art liquid fuel injector and optimum combustion efficiency.

SUMMARY

A direct in cylinder compressed gas injector with poppet valve and complementary valve seat. Poppet valve with a shoulder and passage that interfaces with the injector supplying gas to the injector. In another aspect, a fuel supply valve connects to the injector poppet valve when activated. Controlled lubrication of injector and fuel supply valve. A control system arrangement to regulate the supply and end gaseous fuel injection. Another aspect of using a dual fuel nozzle supplying gas and pilot diesel like fuel injector. A pressure transducer for injector prognostics.

DETAILED DESCRIPTION

The present invention is a direct in cylinder gas injector for spark ignited and compression ignition engines.

Figure 1:
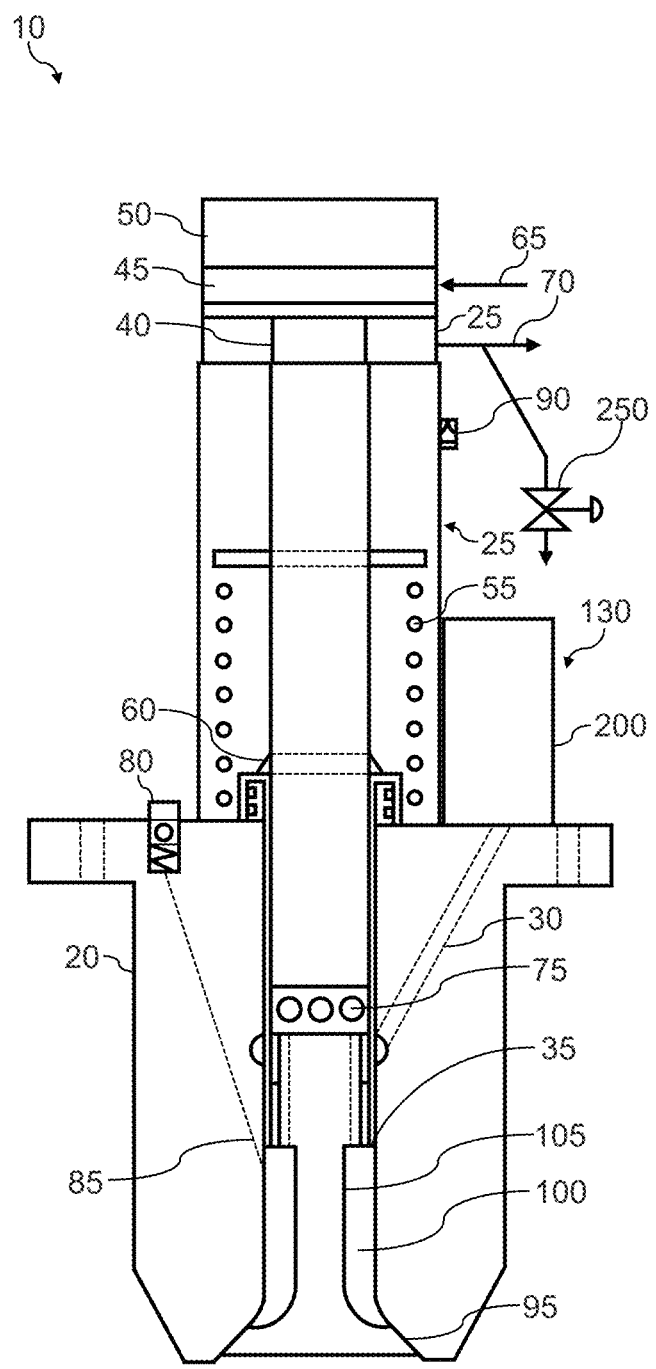
FIG. 1 shows the front and side views of the injector.

Referring to FIG. 1. There is shown a diagrammatic sectioned side view of direct in cylinder gaseous fuel injector 10. The injector shown in FIG. 1 is the preferred embodiment of the present invention and may employ different types of gaseous fuel. Fuel injector 10 consists of an injector body 20 made of various components attached to each other, well known in this art, and a number of movable parts positioned in a manner that would initiate and end fuel injection. The gaseous fuel source to the injector 10 is supplied through gaseous communication passage 30 defined in the injector body 20. Fuel injector 10 is controlled in operation by the hydraulic actuator 40 or by a piezo actuator. The invention uses engine lubricating oil or other pressurized lubricating fluid. The control valve assembly is controlled by a solenoid 50 or may be controlled by a piezoelectric actuator. When solenoid 50 is de-energized and hydraulic piston control valve 40 is in its upward position, valve 105 seated in valve seat 95 is closed. The injector valve closing rate is controlled by a hydraulic or electronic actuator. Fuel communicating passage 30 in the injector body 20 is sealed by the poppet valve shoulder 35. The cavity 100 in the injector body 20 and valve shoulder 35 remain free of pressurized fuel.

Figure 3:
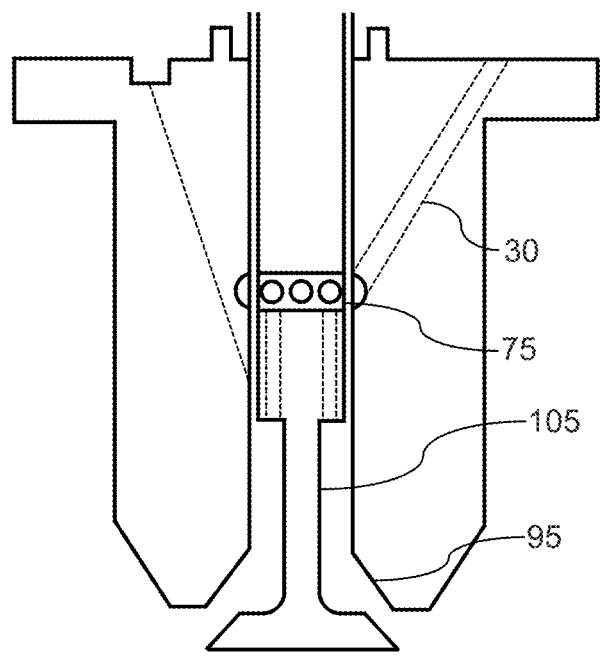
FIG. 3 shows the position of the poppet valve when actuated.

FIG. 1, Energizing solenoid 50 causes pressurized hydraulic fluid flow through 65 into upper chamber area 45 of the piston in control valve 40. Pressurized oil in chamber 45 acting on piston 40 causes fuel injector valve 105 to move downwards against spring 55. FIG. 3 shows the downward valve travel position communicating drilled passage 35 in valve 105 with pressurized fuel supply line 30. Fuel communication passage 30 in the injector body receives pressurized fuel from supply valve 130.

Figure 2:
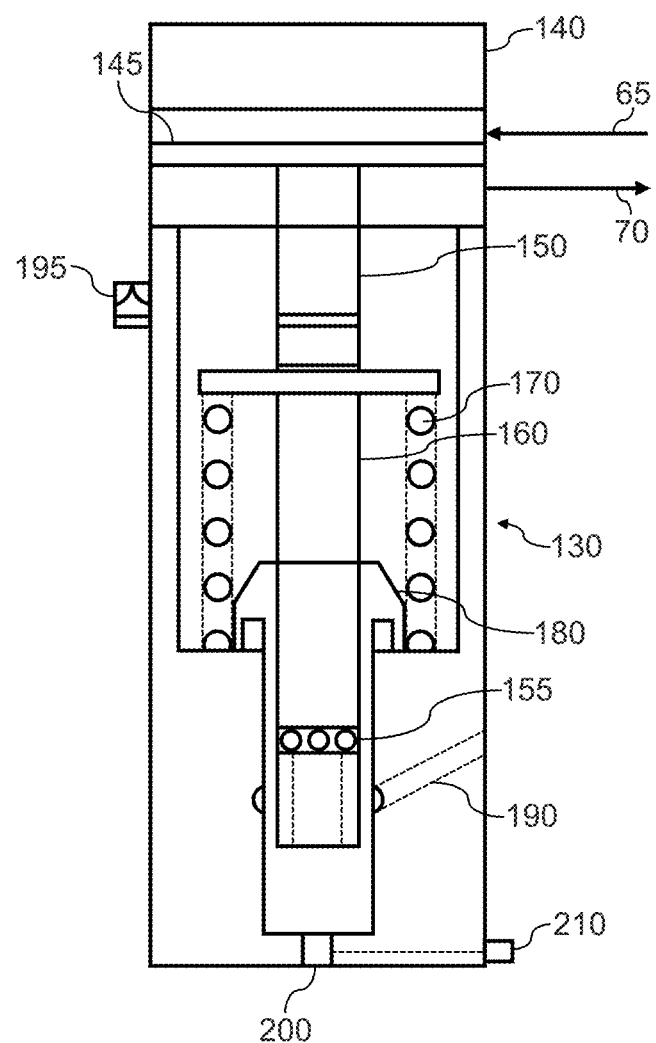
FIG. 2 shows the front of the hydrogen supply valve for the injector.
Figure 4:
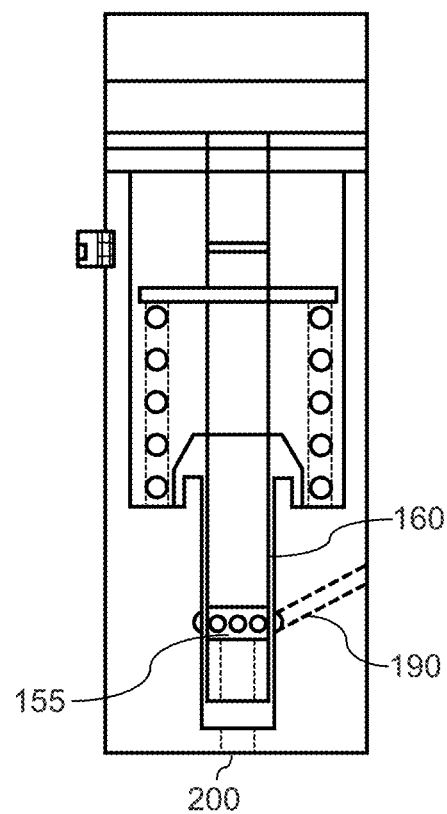
FIG. 4 shows the fuel supply valve actuated and supplying pressurized gaseous fuel to the injector.

FIG. 2, Fuel supply valve 130 controls the flow of gaseous fuel into fuel communicating passage 30 for injector 10. Fuel supply valve 130 is actuated by a hydraulic actuator or piezo actuator 140. Pressurized hydraulic fluid 65 acting on the upper piston area 145 causes the plunger 150 to travel downward. Plunger 150 in direct contact with valve 160 moves downward compressing spring 170. FIG. 4 Valve 160 downward travel communicates high pressure fuel supply through drilled holes in valve drilled passage 155.

FIG. 4/FIG. 2 communication passage 200 sends high pressure gas supply to passage 30 in FIG. 1 injector 10.

FIG. 3 shows the position of the fuel supply passage 30 in communication with valve drilled passage 75. Actuated valve 105 in open position injecting pressurized gaseous fuel into the engine.

Figure 5:
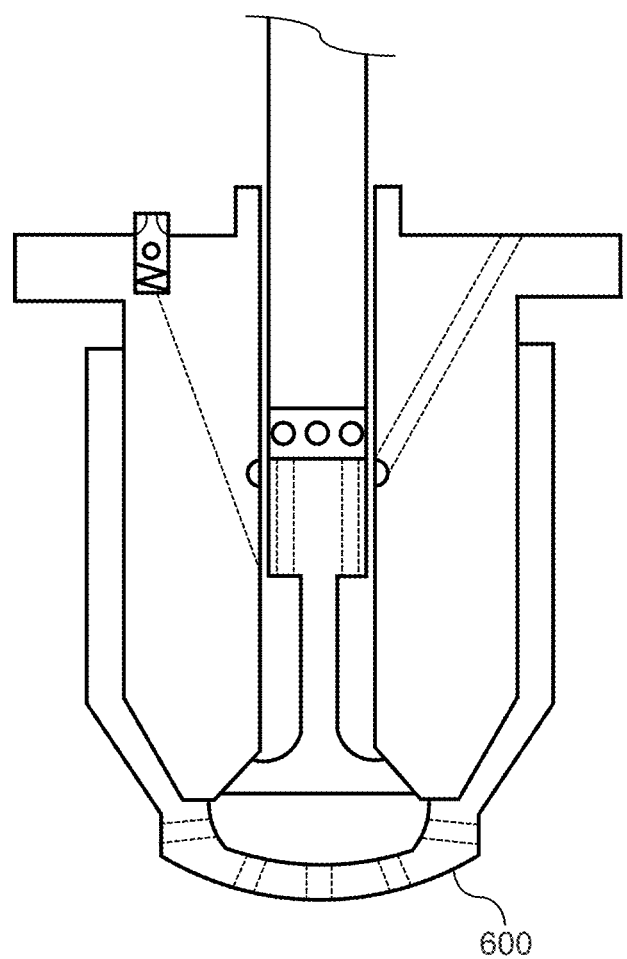
FIG. 5 shows a nozzle piece attachment to the injector for multiple gas flow passages.

FIG. 5 includes a nozzle attachment 600 that orients gas flow to multiple locations in the engine.

Figure 6:
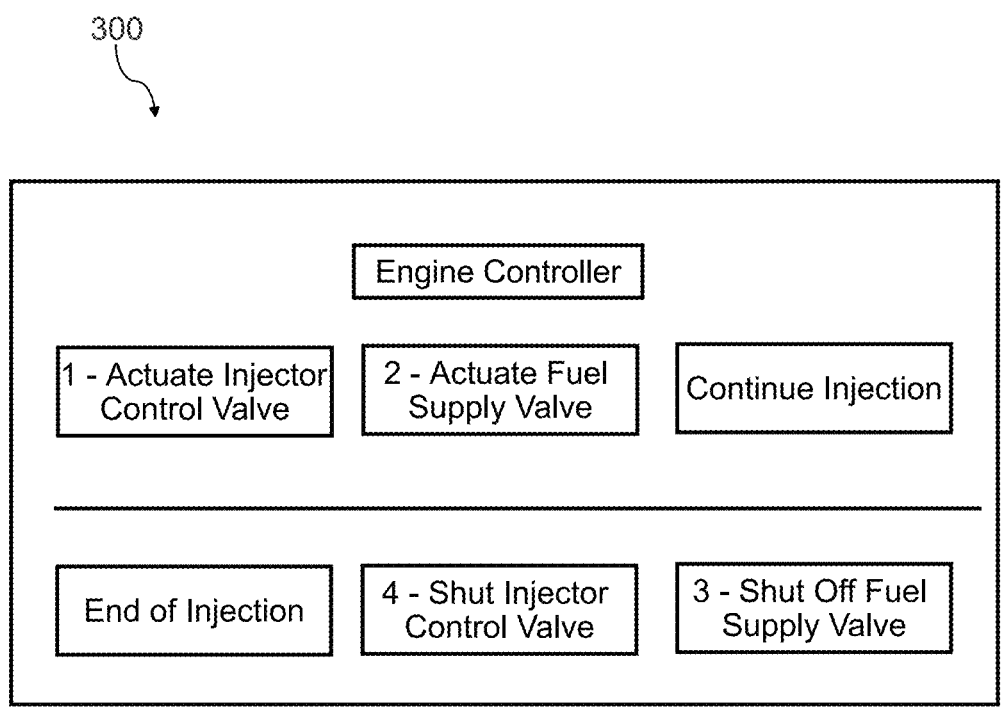
FIG. 6 shows a flow chart for the sequence of injector operation.

FIG. 6 shows the sequence for valve actuation of the gaseous fuel injector to commence injection. 1) Actuate injector poppet valve 105 first. 2) Actuate Fuel supply valve 130 3). Actuated fuel injector poppet valve 105 opens and injects gaseous fuel.

FIG. 6 shows the sequence of the end of the injection. FIG. 2, Fuel supply valve 130 de-energizes solenoid 140. Pressurized hydraulic fluid supply 65 is shut off and drain 70 is open. Valve spring 170 exerts upward force on sliding valve 160, transmitting upward force through control valve 150 attached to piston 145. Fuel supply valve drilled passage 155 discontinues communication with 190 fuel supply inlet when the sliding valve 160 moves upward. Fuel supply communication passage 200 in FIG. 2 discontinues fuel supply to passage 30 in FIG. 1.

FIG. 1 fuel injector 10, de-energize solenoid 50. Pressurized hydraulic fluid supply 65 is shut off and drain 70 is open. Valve spring 55 exerts upward force on the piston moving the plunger 40 upwards. Injector poppet valve 105 moves upward caused by spring 55 upward force. Upward movement of injector poppet valve drilled passage 75 ceases communication with fuel supply passage 30. Poppet Injector valve 105 is then seated in valve seat 95 and the area of the opening 100 above the seat is free of compressed high pressure gaseous fuel.

FIG. 1, Vent drain 70 fluid communicates with oil passage 80 upon actuation of control valve 250. Passage 80 which includes a check valve and a restrictor controls oil flow into 85 below the shoulder of the injector poppet valve 105 when it is fully closed. The oil passage opening through valve body 85 is open when the injector valve 105 remains shut and the pressure in cavity 100 is low to allow lubricating oil to flow into valve seat 95. Vent passage 70 is also in communication with the upper body 25 through control valve 250 feeds into the check valve and restrictor 90 to flow oil to upper body 25. FIG. 1 Valve seal 60 causes secondary oil path for injector poppet valve 105.

Figure 8:
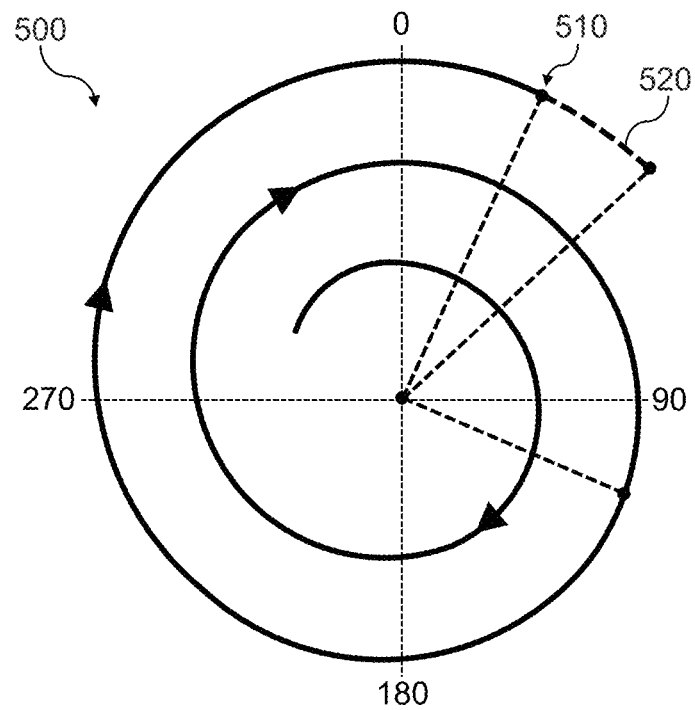
FIG. 8 illustrates late cycle injector opening without injecting fuel by keeping the fuel supply valve shut to optimize lubrication.

Optimized oil flow into the injector is achieved by modulating the injector valve 105, in FIG. 1, opening late as shown in FIG. 8. Modulating the injector opening 510 after the end of the engine exhaust period and then closing it at 520 ensures trapped gas pressure in cavity 100, FIG. 1 is further reduced. The fuel supply valve 130 in FIG. 2 during this period remains shut and there is no gaseous fuel supply to injector valve 105.

FIG. 2, Vent passage 70 in communication with fuel supply valve 130 through a check valve and restrictor 195 flow oil to valve seal in spring cage.

FIG. 1 Control valve 250 regulates the flow of lubricating fluid 70 to injector body 80, and upper body spring cage area 90 of the injector FIG. 2 Control valve 250 controls hydraulic oil 70 to fuel supply valve spring cage area 195.

FIG. 2 Pressure transducer 210 monitoring injector seal effectiveness using machine learning for prognostics.

Figure 7:
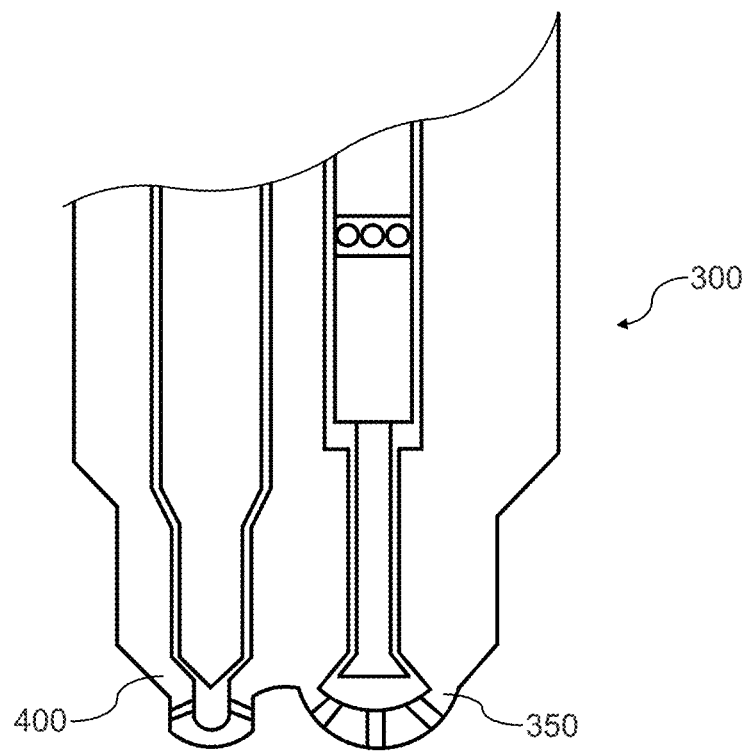
FIG. 7 Dual fuel gaseous and liquid injector nozzle.

FIG. 7, dual fuel injector nozzle 300 with hydrogen gaseous injector 350 and liquid fuel injector 400.

FIG. 8, timing diagram 500 for late opening of fuel injector 10, and fuel supply valve 130 shut off.

What is claimed is:

1. A method of operating a compressed gas injector for mounting directly in a cylinder of an internal combustion engine, comprising:
    energizing a solenoid to move a poppet valve from a closed position to an opened position, the poppet valve coupled to an injector valve stem shoulder with drilled passages;
    actuating a fuel supply valve to supply a compressed gas into the compressed gas injector via the drilled passages in response to the poppet valve moving to the opened position; and
    de-energizing the solenoid to move the poppet valve to the closed position, the poppet valve in contact with a valve seat when in the closed position, the poppet valve defining complementary seat angles between 25 degrees and 65 degrees.

2. The method of claim 1, further comprising:
    shutting of the fuel supply valve before de-energizing the injector solenoid, thereby limiting trapped gas pressure above the valve seat.

3. The method of claim 1, wherein the compressed gas is delivered to the compressed gas injector at a pressure of up to about 10,000 psi.

4. The method of claim 1, further comprising:
    monitoring the pressure of compressed gas passage to the injector upon activation of the fuel supply valve to determine the operation of the fuel supply valve.

5. The method of claim 1, further comprising:
    monitoring the pressure of compressed gas passage to the injector upon deactivation of the fuel supply valve to confirm closure of the fuel supply valve.

6. The method of claim 1, wherein the decay of trapped gas pressure is monitored after the fuel supply valve is opened and closed before starting the internal combustion engine to monitor leakage.

7. The method of claim 1, wherein the poppet valve and the fuel supply valve can be shut to protect them from failures.

8. The method of claim 1, further comprising:
    modulating the poppet valve coupled to the injector after the end of the injection period following the closure of the engine exhaust valve to lower the trapped pressure above the valve seat.

9. A compressed gas injector for mounting directly in a cylinder of an internal combustion engine, comprising:
- a poppet valve;
- an injector valve stem shoulder coupled to the poppet valve, the injector valve stem shoulder defining a drilled passage through which a compressed gas can be conveyed into the compressed gas injector in response to movement of the poppet valve; and
- a valve seat.

10. The compressed gas injector of claim 9, wherein the poppet valve and the valve seat define complementary seat angles between 25 degrees and 65 degrees.

11. A compressed gas injector mounted directly in a cylinder of an internal combustion engine, comprising:
- a nozzle;
- a poppet valve; and
- an injector body;
- wherein the injector body is attached to the nozzle below the poppet valve to convey compressed gas exiting from the poppet valve into the engine cylinder.

12. The compressed gas injector of claim 11, wherein the nozzle defines a plurality of holes ranging from 1 to 10 holes, the plurality of holes directing gas fuel jets into the engine cylinder in a combustion chamber of the internal combustion engine.

13. The compressed gas injector of claim 11, wherein an included hole angle of the plurality of holes ranges from 0 to 170 degrees for mixing gaseous fuel injected in the combustion chamber of the internal combustion engine.

\* \* \* \* \*